Oct. 30, 1962　　F. P. HEALY ET AL　　3,060,812
MILLING MACHINE
Filed June 3, 1959　　　　　　　　　　4 Sheets-Sheet 1
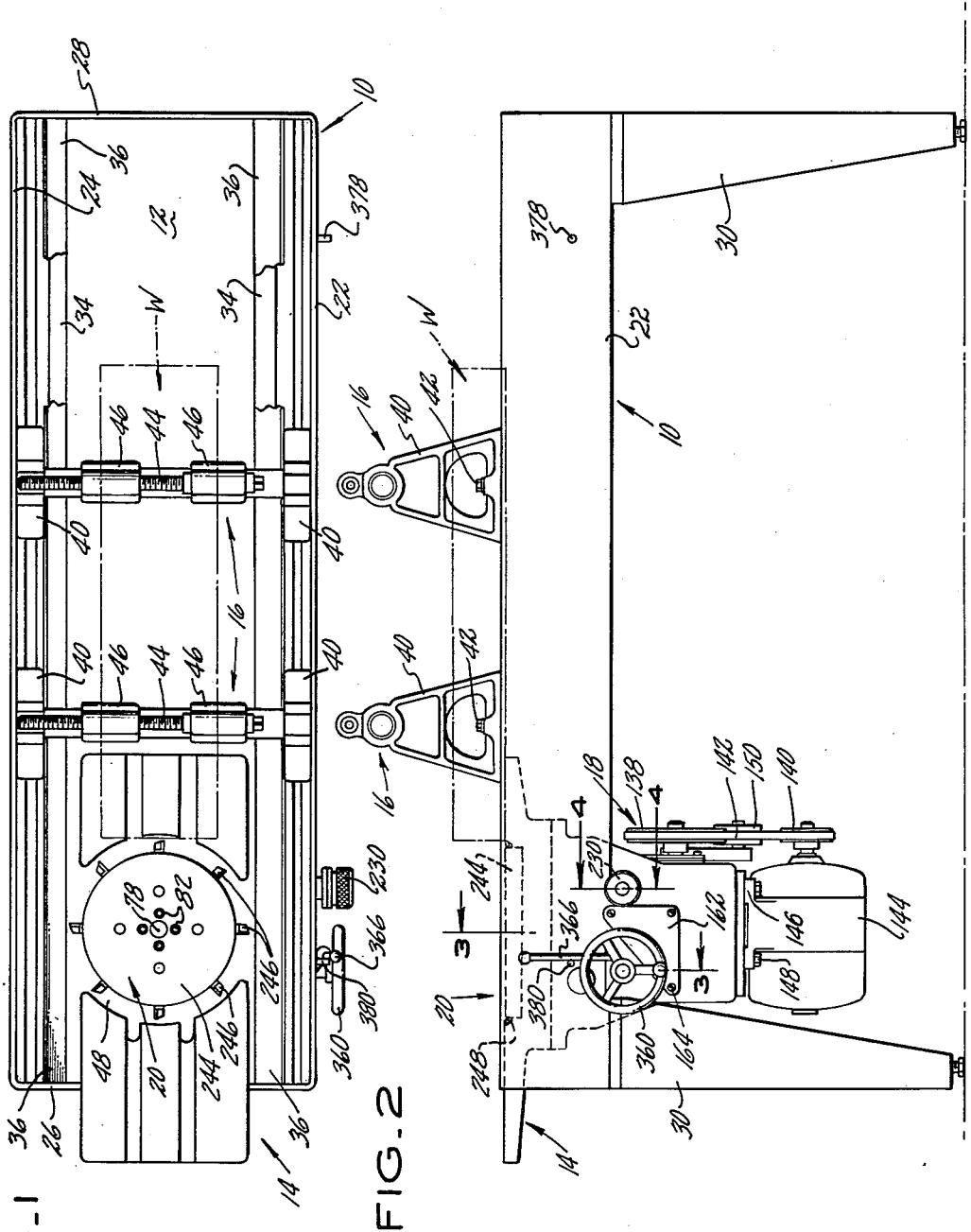
INVENTORS
FRANCIS P. HEALY
EDWARD A. ALLEN
BY Teller & McCormick
ATTORNEYS INVENTORS
FRANCIS P. HEALY
EDWARD A. ALLEN
BY Teller & McCormick
ATTORNEYS Oct. 30, 1962 F. P. HEALY ET AL 3,060,812
MILLING MACHINE
Filed June 3, 1959 4 Sheets-Sheet 3
FIG_5
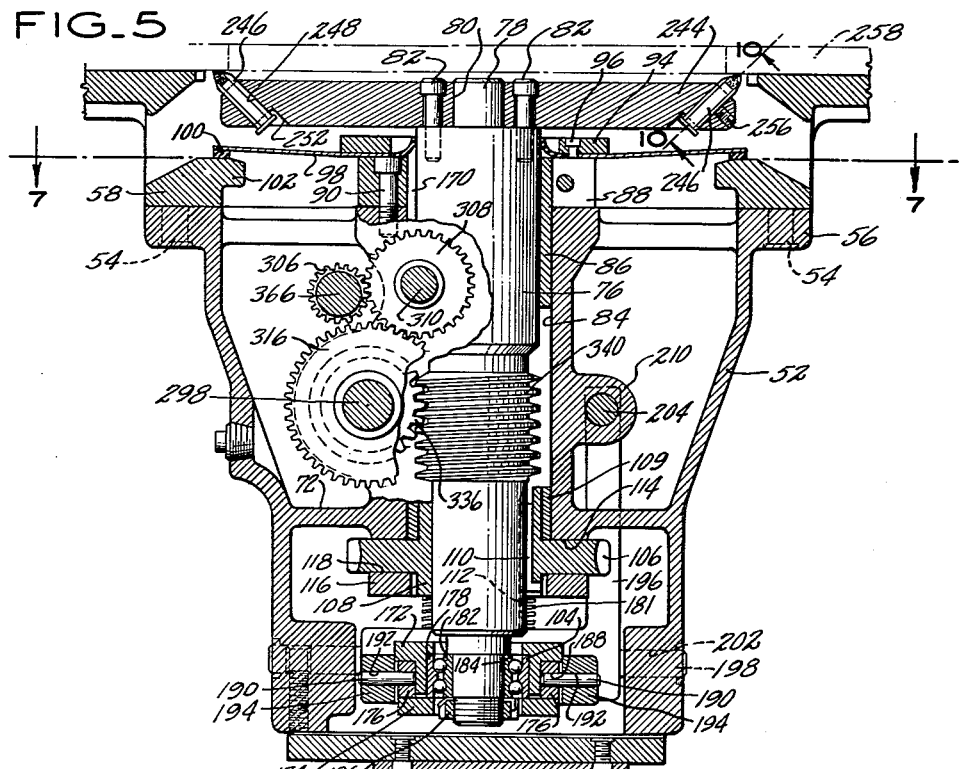
FIG_6
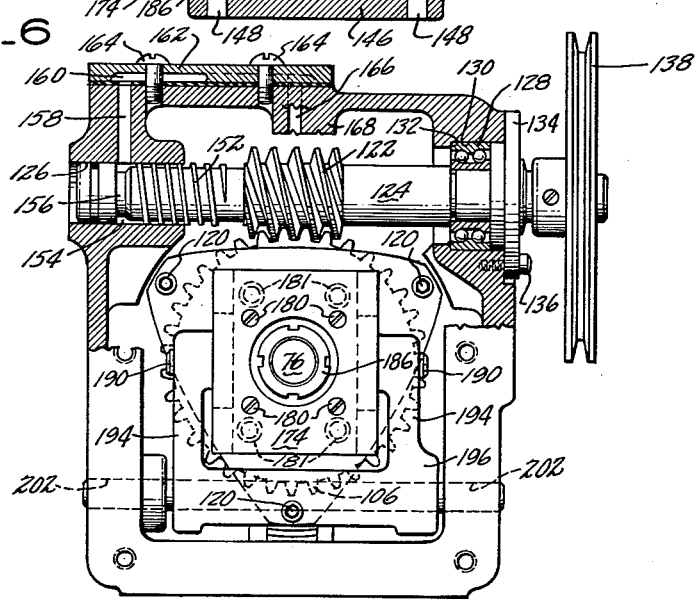
INVENTORS
FRANCIS P. HEALY
EDWARD A. ALLEN
BY Teller & McCormick
ATTORNEYS Oct. 30, 1962  F. P. HEALY ET AL  3,060,812
MILLING MACHINE
Filed June 3, 1959  4 Sheets-Sheet 4

INVENTORS
FRANCIS P. HEALY
EDWARD A. ALLEN
BY Teller & McCormick
ATTORNEYS

United States Patent Office 3,060,812
Patented Oct. 30, 1962

3,060,812
MILLING MACHINE
Francis P. Healy, Springfield, and Edward A. Allen, Westfield, Mass., assignors to Van Norman Industries, Inc., Springfield, Mass., a corporation of Massachusetts
Filed June 3, 1959, Ser. No. 817,842
14 Claims. (Cl. 90—15)

This invention relates to a milling machine adapted to handle comparatively large and heavy workpieces.

It is the general object of the invention to provide a milling machine which is particularly adapted to conveniently accommodate comparatively large, heavy workpieces for large area milling and which includes means for facilitating the precise location and the positive retention of such workpieces in position for machining.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a plan view of a milling machine embodying the invention;

FIG. 2 is a front elevational view of the milling machine shown in FIG. 1;

FIG. 5 is a sectional view with certain parts thereof in elevation taken in two longitudinal vertical planes generally as indicated by the line 5—5 in FIG. 3;

FIG. 6 is a sectional view taken in two horizontal planes generally as indicated by the line 6—6 in FIG. 3;

Figure 3:
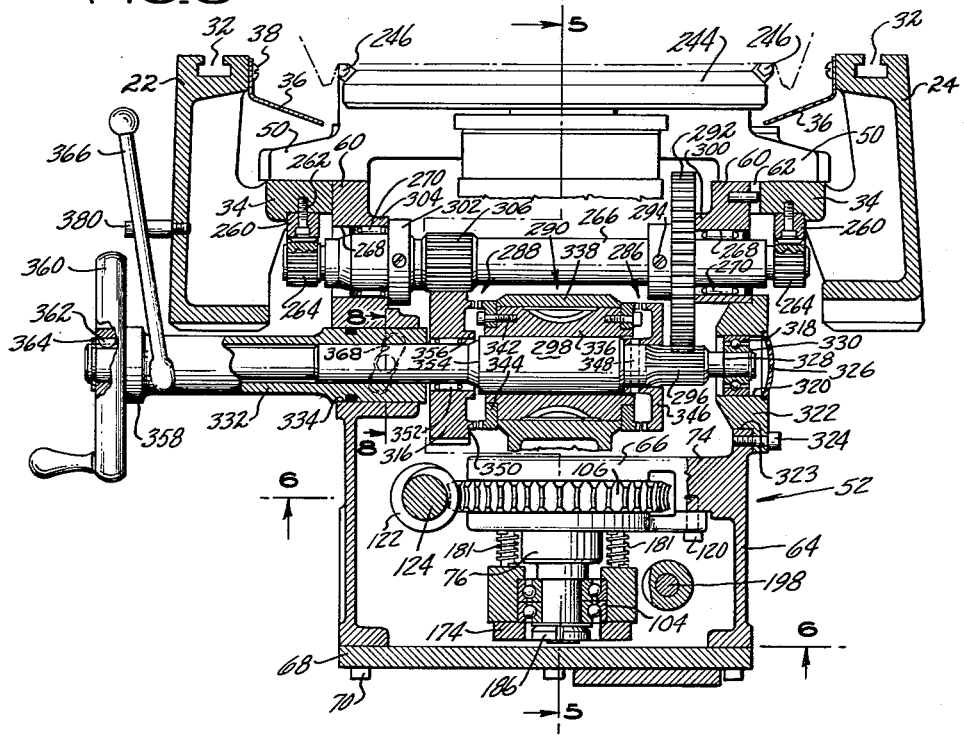
FIG. 3 is an enlarged sectional view of a portion of the milling machine with certain parts thereof in elevation, the view being taken in two transverse vertical planes generally as indicated by the line 3—3 in FIG. 2.

The milling machine shown in the drawings is particularly adapted for machining flat surfaces on comparatively large and heavy workpieces as, for example, for resurfacing the heads of automotive or truck engines. It is to be understood, however, that the invention is not so limited and that milling machines may be constructed in accordance therewith for performing a variety of milling operations on a wide variety of workpieces.

Referring particularly to FIGS. 1 and 2 of the drawings, it will be observed that the milling machine shown therein comprises a frame indicated generally at 10 which is provided with a longitudinal opening 12. The opening 12 in the frame is readily accessible from above the frame and a work locating table indicated generally at 14 is supported for longitudinal movement in said frame opening. The table 14 is adapted to support and accurately position a workpiece placed thereon with the portion or surface of the workpiece which is to be machined facing downwardly. A clamping means indicated generally at 16 is supported on the frame 10 and is adapted to engage a workpiece placed on the locating table 14 and positively hold the workpiece in fixed position so that longitudinal movement of the table may be effected independently of the workpiece to permit machining of the said downwardly facing workpiece surface or portion. The milling machine also includes a carriage indicated generally at 18 which is supported for longitudinal movement in the frame opening 12 beneath a workpiece held in the clamping means 16. A rotatable milling cutter 20 is carried by the carriage 18 and is adjustable vertically so that it can be engaged in cutting relationship with the said downwardly facing workpiece surface or portion during longitudinal movement of the carriage therebeneath to accomplish the desired milling operation.

Obviously, the detailed construction of the frame 10 may vary widely. As shown, the frame comprises similar front and rear members 22 and 24 which extend longitudinally of the milling machine in spaced parallel relationship. The front and rear members 22 and 24 are connected together at their ends by two transversely extending side members 26 and 28 to form a rectangular frame structure. The said frame structure defines the aforesaid longitudinal opening 12 and is supported by four suitable frame legs 30, 30.

As best illustrated in FIG. 3, each of the frame members 22 and 24 is provided with a T-shaped groove 32 which extends longitudinally in an upper portion of its frame member and opens upwardly. Each of said frame members is also provided with a longitudinally extending guide and support rail or way 34 which extends substantially throughout its length. Secured to each frame member above its rail or way 34 by suitable screws 38, 38 is a longitudinally extending shield 36 which prevents chips and the like from falling on the rail or way.

The clamping means 16 may take various forms, but is shown as including four similar A-shaped frames 40, 40, two of which are associated with the front member 22 and two of which are associated with the rear frame member 24. Each of the frames 40, 40 is provided with a suitable downwardly projecting T-shaped member or extension (not shown) which enters and substantially fits the groove 32 in its associated frame member. Suitable binder screws 42, 42 on the frames 40, 40 serve to hold the same in fixed longitudinal positions on the front and rear frame members 22 and 24. Transversely extending threaded rods 44, 44 connect the frames 40, 40 together in opposing pairs and each of said rods carries two clamping nuts 46, 46. Connected to and depending from each of the nuts 46, 46 is an arm (not shown) which is adapted to engage a workpiece at the side thereof. It will be seen that when the table 14 is moved rightwardly from the position shown in FIGS. 1 and 2 and a workpiece is placed thereon and accurately located, the frames 40, 40 may be moved in pairs to positions adjacent the workpiece. The nuts 46, 46 may then be turned as required to engage their associated arms with the sides of the workpiece whereupon the latter will be clamped in position permitting the table to be moved independently thereof.

The table 14 is shown in the drawings as being fixedly connected with the carriage 18 and as supporting the same so as to be movable longitudinally in the milling machine opening 12 in unison therewith. While it is presently preferred that the table and the carriage be connected together in such manner, the invention is not so limited. Said table and carriage could be supported by the machine frame independently of each other and be adapted to be independently movable longitudinally in one obvious alternative construction.

When the work locating table 14 and the carriage 18 are connected together and movable in unison as shown, a vertically extending opening, such as the opening 48, is preferably provided in said table and the milling cutter 20 is disposed in said opening. When the workpiece is placed on the table to be located, the milling cutter is positioned below the level of the table. When the table is thereafter moved from beneath the workpiece after engagement of the clamping means 16 therewith, the milling cutter is adjusted upwardly so that it projects above the level of the table to engage the downwardly facing surface or portion of the workpiece during subsequent movement of the table beneath the workpiece.

When a flat surface is to be machined, as in the case of the machine shown in the drawings, the table 14 is preferably provided with a substantially flat surface, but tables having other surfaces may be provided as required for conveniently supporting and locating other workpieces. Two longitudinally extending flanges 50, 50 are provided on the table 14 as best illustrated in FIG. 3. Said flanges serve to support the table on the aforementioned guide and support rails or ways 34, 34 and each of the flanges is provided with a flat lower surface adapted to engage the upper surface of a corresponding rail or way 34 and to move therealong in longitudinal movement of the table relative to the frame. Transverse movement of the table on the rails or ways 34, 34 is positively prevented by means described hereinafter.

As best illustrated in FIG. 5, a housing 52 of the carriage 18 is connected to the table 14 by a plurality of screws 54 which extend through a flange 56 on said housing and into a lower portion 58 of said table. Said housing has rail or way engaging portions 60, 60, best illustrated in FIG. 3, which serve the aforementioned purpose of preventing transverse movement of the table 14 relative to the rails or ways 34, 34. A gib 62 disposed between one of the housing portions 60 and one of the rails or ways 34 insures a suitably tight engagement of the said housing portions with said rails or ways.

The carriage housing 52 includes two principal portions, namely, an outer portion 64 which encloses and supports the majority of the carriage parts, and an inner portion 66 which is supported by said outer portion and which is shown as being formed integrally therewith. The outer portion 64 of the housing 52 extends downwardly below the table 14 from its flange 56 and is provided at the bottom with a cover plate 68 which is secured thereto by suitable screws 70, 70. The inner portion 66 of the carriage housing is of an irregular shape and is connected to and supported by the outer portion 64 by means of several integrally formed arms or webs, such as those shown at 72 and 74 in FIGS. 5 and 3. Said inner housing portion 66 encloses and partially supports a vertical drive shaft 76 for the milling cutter 20.

Figure 7:
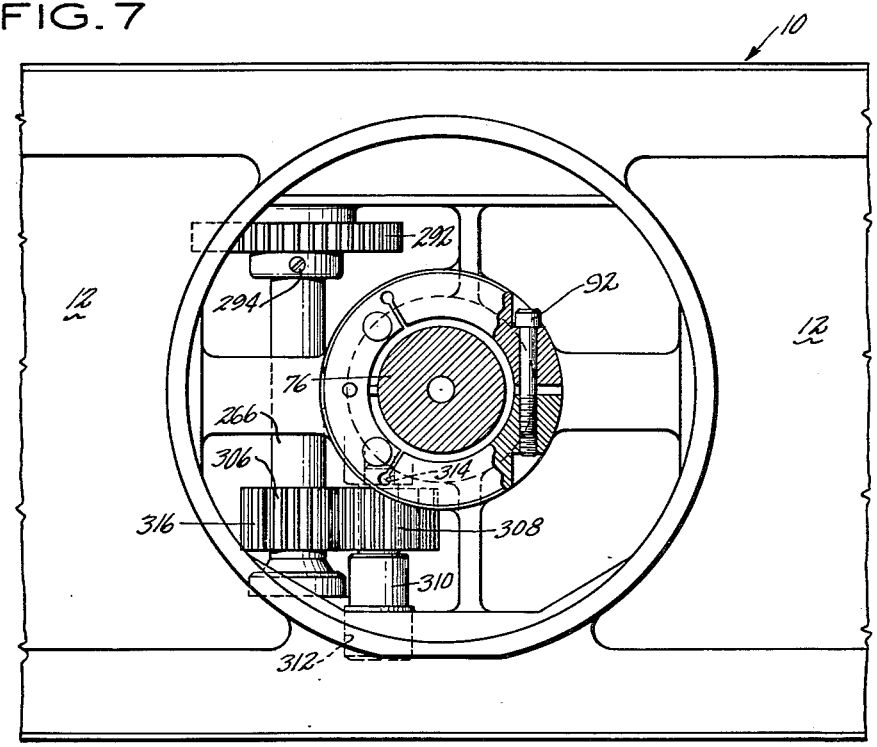
FIG. 7 is a horizontal sectional view taken as indicated by the line 7—7 in FIG. 5.

As best illustrated in FIG. 5, the drive shaft 76 carries the milling cutter 20 at an upper end portion thereof, a reduced diameter portion 78 of said shaft being entered in a suitable opening 80 in the cutter and said cutter being fixedly connected to the shaft by means of a plurality of screws 82, 82. The shaft is supported within a vertical bore 84 provided in the central housing portion 66 and, more specifically, said shaft is rotatably supported at an upper end portion within a sleeve bearing 86 which is disposed partially in the bore 84 and which projects from the upper end of said bore. The sleeve bearing 86 is held in position by means of a split retainer 88 which is secured to the upper end of the inner housing portion 66 by means of a suitable screw 90. A screw 92 (FIG. 7) contracts the retainer 88 so that it tightly engages the projecting portion of the bearing 86 and holds the same in fixed position relative to the housing portion 66.

Associated with the retainer 88 is a ring 94 which is secured thereto by means of a plurality of screws 96, 96 (one shown) and which serves to secure an upper housing cover plate 98 in position. An inner portion of the cover plate 98 is clamped between the ring 94 and the retainer 88 and an outer portion of said plate is provided with a gasket 100 which engages a flange 102 on the table 14 to prevent chips and other foreign matter entering the housing 52.

Bearing means is also provided for rotatably supporting the lower end portion of the drive shaft 76 and said means is shown as comprising a ball bearing unit 104. The ball bearing unit 104 in turn is supported by movable means adapted to effect vertical adjustment of the drive shaft 76, the said means being fully described hereinafter. Obviously, vertical adjustment of the shaft 76 permits the required vertical adjustment of the cutter 20 to be conveniently effected.

The drive shaft 76, in accordance with the presently preferred practice, is adapted to be rotated by suitable power operating means which is suported by the carriage 18. A worm gear 106 connected with the drive shaft 76 is adapted to rotate said shaft and at the same time permit vertical adjustment of the shaft. A hub 108 of the gear 106 is supported for rotation by a sleeve bearing 109 in the bore 84 and embraces the shaft 76 loosely. A key 110 fixedly connected to the hub 108 extends longitudinally therewithin and is entered in a longitudinally extending keyway 112 formed in the shaft 76. The keyway 112 is of sufficient length to permit the necessary vertical adjustment of the shaft 76 with the gear 106 remaining in a fixed vertical position. Said gear is held in such position by means of a flat annular surface 114 on the inner housing portion 66 which surface engages the upper radial face of the gear, and by means of an annular plate 116 secured to said housing portion by means of suitable screws 120, 120 (FIGS. 3 and 6). The plate 116 has a flat upper surface 118 which engages the lower radial face of the gear 106.

As best shown in FIG. 6, the gear 106 is rotated by a worm 122 formed on a horizontally disposed shaft 124. The shaft 124 has one end portion thereof supported for rotation in a suitable bore 126 in the outer portion 64 of the carriage housing 52. An intermediate portion of said shaft is supported for rotation in a ball bearing unit 128 supported within a suitable bore 130 formed in the outer housing portion 64. The ball bearing unit 128 is secured against axial movement by a shoulder 132 on the housing portion 64 and by a cover plate 134 which is secured to the said housing portion by suitable screws 136, 136. The other end of the shaft 124 projects through a suitable opening in said cover plate and a pulley 138 is fixedly mounted thereon. The pulley 138 is connected with and driven by a pulley 140 by means of a belt 142 preferably of the V-type. As best illustrated in FIG. 2, the pulley 140 is fixedly mounted on the drive shaft of an electric motor 144 which has its base 146 fixedly secured to the cover plate 68 of the carriage housing 52 by means of suitable screws 148, 148. A tensioning roller 150 supported on the housing portion 64 engages the belt 142 to insure a positive driving connection between the pulleys 138 and 140.

From the foregoing, it will be apparent that the motor 144 will operate through the pulleys 138 and 140 and the belt 142 to drive the shaft 124 whereby to drive the worm 122 and the worm gear 106 and rotate the cutter drive shaft 76. It will be further apparent that by reason of the particular connection provided between the worm gear 106 and the drive shaft 76, vertical adjustment of said shaft may be effected as required to adjust the position of the cutter 20.

Figure 4:
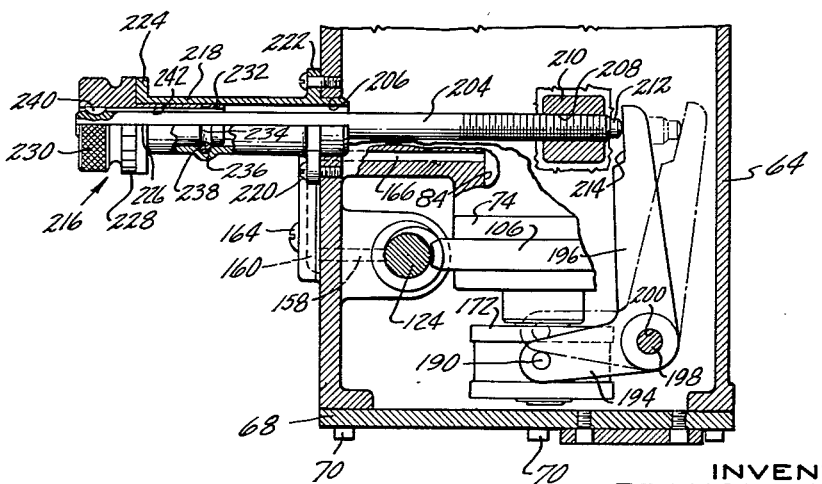
FIG. 4 is a fragmentary vertical transverse sectional view taken as indicated by the line 4—4 in FIG. 2.

Preferably, a forced lubrication system is provided for the cutter drive shaft 76 and, more specifically, for the sleeve bearings 86 and 109. As best illustrated in FIG. 6, the shaft 124 has a spiral flange or rib 152 formed thereon adjacent the end portion thereof which is supported in the housing bore 126. The lower portion of the carriage housing 52 serves as an oil reservoir and the shaft 124 is submerged in the oil so that the flange 152 is operable as an oil pump. More specifically, the flange 152 pumps oil from the interior of the lower portion of the housing into an annular chamber 154 defined by a reduced diameter portion 156 of the shaft 124 and the wall of a bore 126. Pressurized oil flows from the said chamber 154 through a passageway 158 in the housing to a passageway 160 formed in a plate 162 which is secured to the front of the housing by suitable screws 164, 164. From the passageway 160, the oil is directed through a passageway 166 in a web or arm 168 extending between the outer housing portion 64 and the inner housing portion 66. As best shown in FIG. 4, the passageway 166 communicates with the bore 84 in the inner housing portion 66. Said passageway 166 opens to the bore 84 between the sleeve bearings 86 and 109 and the gear hub 108 and the sleeve bearing 109 prevent the oil from flowing downwardly in the bore 84. The level of the oil in said bore consequently rises so that the sleeve bearing 86 is lubricated thereby. Said bearing 86 is preferably of the split type, as indicated at 170 in FIG. 5, so that the oil within the bore 84 is permitted to rise freely and effectively lubricate the bearing throughout its length.

The aforementioned means supporting the bearing unit 104 at the lower end portion of the cutter drive shaft 76 comprise, in preferred form, upper and lower bearing support rings 172 and 174 and two similar inserts 176, 176 disposed between said rings. As shown in FIG. 5, the upper support ring 172 engages the upper end of the outer race 178 of the ball bearing unit 104 and the lower support ring 176 engages the lower end of said race. The said upper and lower support rings are held securely in engagement with the bearing race with the inserts 176, 176 therebetween by means of suitable screws 180, 180. A plurality of biasing means comprising pin and spring units 181, 181 are disposed between the upper support ring 172 and the aforementioned gear retaining plate 116 with the ends of the pins entered in suitable openings in said ring and plate and said means serve to urge the said ring downwardly. An inner race 182 of the ball bearing unit 104 is engaged at its upper end by a shoulder 184 formed on the cutter drive shaft 76 and the lower end of said race is engaged by a nut 186 threaded on the lower end portion of the drive shaft 76. Thus, vertical movement of the support rings 172 and 174 will effect corresponding vertical movement of the bearing unit 104 and thus effect movement of the drive shaft 76 and the milling cutter 20 in a vertical direction.

As best illustrated in FIG. 5, each of the inserts 176, 176 is provided with a circular opening 188 which extends horizontally therein. The openings 188, 188 in the inserts 176, 176 respectively receive connecting pins 190, 190 which project therefrom and are entered in suitable openings 192, 192 formed in branches 194, 194 of a bifurcated base portion of an L-shaped lever 196. As best shown in FIG. 4, the lever 196 is mounted on a horizontally extending pivot pin 198 which is entered in a suitable aperture 200 formed at the junction of its base and upright portion. The pivot pin 198 is journaled at its ends in suitable bores 202, 202 formed in the outer housing portion 64, as best shown in FIGS. 5 and 6.

From the foregoing, it will be apparent that the lever 196 may be pivoted about the pin 198 to effect vertical movement of the bearing unit support means comprising the rings 172 and 174 and the inserts 176, 176 whereby to adjust the position of cutter drive shaft 76 and the cutter 20 vertically. As best illustrated in FIG. 4, a means for manually effecting pivotal movement of the lever 196 and for precisely establishing the vertical position of the drive shaft 76 and cutter 20 is provided and preferably includes a threaded rod 204. The rod 204 extends horizontally within the housing 52 and projects through a suitable opening 206 in the front of said housing. Adjacent its inner end portion, the rod is entered in a suitable threaded horizontal opening 208 formed in a lug 210 on the inner housing portion 66. Thus, rotation of the rod 204 will effect axial movement of the same and will cause the lever 196 to be pivoted about the pin 198, an inner end portion 212 of said rod being in engagement with a flat 214 formed adjacent the top of the upright portion of said lever. As shown in FIG. 4, the rod 204 is rotated to cause clockwise pivotal movement of the lever 196 in order to elevate the support means for the bearing unit 104 and thus raise the shaft 76 and cutter 20. The aforementioned pin and spring units 181, 181 cause said support means, shaft and cutter to be lowered in the housing 52 when the rod 204 is rotated in an opposite direction to effect counterclockwise lever movement.

Preferably, there is provided a gage means, indicated generally at 216 in FIG. 4, which is operatively associated with the rod 204 and which provides a visual indication of the vertical position of the cutter 20. A sleeve 218 surrounding the portion of the rod 204 which projects from the housing 52 is secured to the housing by means of suitable screws 220, 220 in an annular flange 222 on the inner end of said sleeve. An annular flange 224 formed integrally on the outer end of the sleeve 218 is provided with an index mark 226 which is adapted to cooperate with a scale 228 on a knob 230. The knob 230 is adapted to be turned manually and is connected with the rod 204 so as to rotate said rod. An extension 232 formed integrally with the knob 230 extends within the sleeve 218 and receives the projecting end portion of the rod 204. Adjacent the inner end of the extension 232, an annular recess 234 is provided and disposed partially in said recess and partially within an adjacent recess 236 in the sleeve 218 is a pin or dowel 238. The pin 238 serves to secure the knob extension 232 to the sleeve 218 and permits rotation of said knob relative to said sleeve while preventing movement of the knob axially with respect to the sleeve. A key 240 fixedly connected to the rod 204 cooperates with an axially extending keyway 242 in the knob extension 232 to effect rotation of said rod with the knob. The keyway 242 is of sufficient length to permit the axial movement of the rod 204 relative to the knob 230 which is necessary for pivoting the lever 196.

Figure 10:
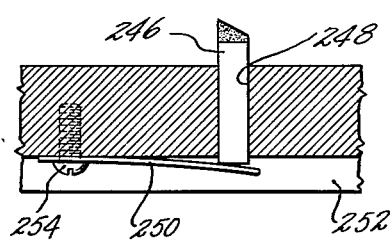
FIG. 10 is an enlarged sectional view of the milling cutter taken as indicated by the line 10—10 in FIG. 5.

It will be apparent from the foregoing that the knob 230 may be rotated to adjust the milling cutter 20 vertically relative to the table 14 to establish precisely the position of said cutter for machining a cut of selected depth in a workpiece. The machine shown is particularly adapted for milling flat surfaces and, accordingly, the cutter 20 is similarly adapted and comprises a circular head 244 which supports a plurality of cutting tools or bits 246, 246. As shown in FIG. 1, the tools 246, 246 are circumaxially arranged and are substantially evenly spaced about the periphery of the head 244. In FIG. 5, it will be observed that the tools 246, 246 are supported respectively in a plurality of inclined openings 248, 248 formed around the periphery of the head 244. The said tools project from said openings and extend upwardly and outwardly from the head 244. As best shown in FIG. 10, each of the tools is urged out of its corresponding opening 248 by a leaf spring 250 which engages its inner end. The leaf springs 250, 250 are disposed in an annular recess 252 in the cutter head 244 and are secured to said head by means of suitable screws 254, 254. The tools or bits are positively retained in the openings 248, 248 by means of set screws 256, 256 shown in FIG. 5.

Also in FIG. 5, there is shown in phantom a gage block 258 which is disposed on the edge of the table 14 and which projects over one of the tools 246. Said one tool is shown as having one of its cutting edges in engagement with the bottom surface of the gage block. This showing is suggestive of a convenient method for locating the tools 246, 246 which is provided for by the particular cutter construction and arrangement shown. If the cutting edges of each tool are carefully lapped so as to intersect precisely at the longitudinal centerline of the tool, it will be seen that the points of the tool can be located so as to lie in a common circle spaced upwardly and outwardly from the head 244 merely by establishing identical vertical positions for the corresponding cutting edges of the tools. That is, if the tools are lapped as described and if they are positioned so that their upper cutting edges are disposed in a common plane, the desired location of the points of the tools in a common circle will be automatically accomplished.

The method by which the position of the tools may be established with the gage block 258 should be quite apparent from the foregoing. The set screw 256 associated with a tool is loosened whereupon the upper cutting edge of the tool is urged into engagement with the lower surface of the gage block by the spring 250 associated therewith. The desired position of the tool is thus established and the set screw 256 is then tightened to secure the tool in place. Each succeeding tool is located in a similar manner on rotation of the cutter head to move the tool beneath the gage block whereupon the cutter is conditioned for machining a flat surface of a workpiece.

It will be apparent from the foregoing that the necessary setup operations on the cutter 20 may be accomplished after the table 20 and carriage 18 have been moved from beneath a workpiece W whereupon the said table and carriage may be moved manually to machine a flat surface at the bottom of the workpiece. However, it is preferred practice to provide for automatic feed and rapid traverse return movements of the cutter longitudinally beneath the workpiece. A rack 260, best illustrated in FIG. 3, is fixedly secured to each of the guide and support rails 34 in accordance with the presently preferred practice. The racks 260, 260 are secured to their respective rails by suitable screws 262, 262 and extend longitudinally of the machine frame. Two pinions 264, 264 respectively engage the racks 260, 260 and are mounted on opposite end portions of a horizontal shaft 266 which extends transversely in the carriage housing 52. The shaft 266 has its said opposite end portions disposed externally of the carriage housing outer portion 64 and extends through similar front and rear openings 268, 268 formed in said housing portion. A roller or needle bearing unit 270 is disposed in each of the housing openings 268 and the shaft 266 is supported for rotation by said bearing units.

Figure 9:
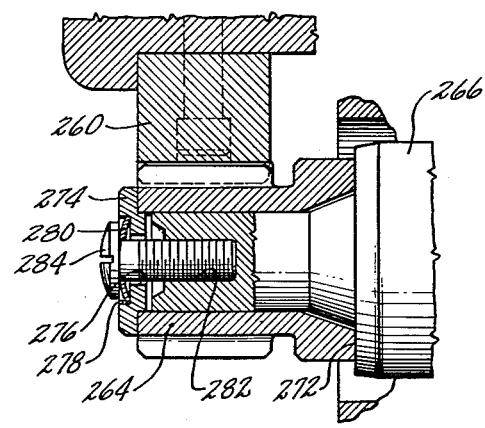
FIG. 9 is an enlarged sectional view of a rack and pinion device incorporated in the milling machine.

The pinions 264, 264 are preferably connected with the opposite end portions of the shaft 266 in the manner shown in FIG. 9. The inner end of each pinion 264 engages a shoulder 272 formed on the shaft 266 and the outer end of the pinion projects slightly beyond the adjacent end of the said shaft. A cap 274 associated with the pinion is adapted to engage the outer end thereof and has a central opening 276 formed therein which is countersunk as at 278. Disposed in the countersink 278 is a spring means comprising a Belleville washer 280 and engaging said washer and extending through the opening 276 and into a suitably threaded opening 282 in the end of the shaft 266 is a screw 284. It will be seen that the screw 284 may be tightened to deflect the washer 280 inwardly whereby to urge the cap 274 inwardly and thus force pinion 264 against the aforementioned adjacent shoulder 272 on the shaft 266. The said pinion will thus be held in friction tight engagement with the shaft so as to be rotated therewith. In the event that an excessive force resisting rotation of the pinion is encountered, the holding friction will be overcome and the pinion will rotate relative to the shaft 266 whereby to avoid damage thereto and to the rack 260.

In accordance with presently preferred practice, the shaft 266 is rotated in one direction by means of a first gear train, indicated generally at 286 (FIG. 3), whereby to cause the pinions 264, 264 to travel along the racks 260, 260 and move the table 14, the carriage 18, and the cutter 20 in a feeding direction or toward the left in FIG. 1. A second gear train, indicated generally at 288, is adapted to rotate the shaft 266 in an opposite direction and thereby cause the pinions 264, 264 to travel along the racks 260, 260 moving the said table, carriage, and cutter in a reverse or rapid traverse return direction (rightwardly in FIG. 1). The said first and second gear trains 286 and 288 are actuated selectively by clutch means indicated generally at 290 and which will be described fully hereinbelow.

The first gear train 286 comprises a driving gear 292 of comparatively large diameter which is fixedly secured to the shaft 266 by means of a set screw 294. The gear 292 meshes with and is driven by a gear 296 of smaller diameter which is formed adjacent a rear end portion of a horizontal shaft 298 supported for rotation about a transversely extending axis in the carriage housing 52. The gear 292 has its rear radial face in engagement with a boss 300 formed adjacent the rear opening 268 in the housing portion 64 to prevent rearward axial movement of the shaft 266, forward axial movement of said shaft being prevented by a collar 302 which is fixedly secured thereto and which engages a boss 304 formed on the housing portion 64 adjacent the front housing opening 268.

The second gear train 288 includes a gear of comparatively small diameter 306 which is formed on the shaft 266. The gear 306 meshes with and is driven by an idler gear 308 best illustrated in FIGS. 5 and 7. The idler gear 308 is mounted for rotation on a stub shaft 310 which is journaled at its end in suitable openings 312 and 314 formed respectively in the outer portion 64 and the inner portion 66 of the housing 52. Connected in driving relation with the idler gear 308 is a driving gear 316 best illustrated in FIGS. 3 and 5. It will be seen that the idler gear 308 serves to reverse the direction of drive so that rotation of the driving gears 296 and 316 in the same direction will effect rotation of the shaft 266 in opposite directions. The idler gear 308 is somewhat larger in diameter than the gear 306 and the gear 316 is somewhat larger in diameter than the gear 308. Thus, it will be further seen that rotation of the driving gears 296 and 316 at the same speed will result in rotation of the shaft 266 at substantially different speeds. When the shaft 266 is turned through the first gear train 286 with the gear 296 driving, the rotative speed of said shaft will be substantially lower than when it is turned in an opposite direction by the second gear train 288 with the gear 316 driving.

Referring now to the shaft 298, it will be observed in FIG. 3 that a rear end portion thereof is supported by a ball bearing unit 318 rearwardly of the gear 296 on said shaft. The ball bearing unit 318 is in turn supported within a horizontal bore 320 formed in a cap or plug 322. The cap 322 is partially disposed in a suitable opening 323 in the outer portion 64 of the carriage housing 52 and is secured to said housing portion by means of suitable screws 324 (one shown). The outer or rear end of the bore 320 in the cap 322 is closed by a snap-type dust cover 326. The length of the bore 320 in the cap 322 is sufficient to permit substantial axial sliding movement of the ball bearing unit 318 and said ball bearing unit is held in fixed axial position on the rear end portion of the shaft 298 between a shoulder 328 thereon and a snap ring 330. Also supporting the shaft 298 is a sleeve 332 which projects from and which has its rear end portion entered in an opening 334 in the front of the outer housing portion 64. The said sleeve is rotatable and slidable axially within the housing opening 334 and the shaft 298 may also be moved axially, the ball bearing unit 318 sliding axially therewith in the bore 320 during such movement.

The aforementioned clutch means 290 is operable to selectively actuate the first and second gear trains 286 and 288 and in accordance with presently preferred practice, said clutch means is actuated by axial movement of the shaft 298 and the sleeve 332. A first part of the clutch means 290 is continuously connected with and driven by the cutter drive shaft 76 and comprises a worm gear 336. The said gear is supported for relative rotation about an increased diameter intermediate portion of the shaft 298 within an integral hollow extension 338 of the inner housing portion 66. As best illustrated in FIG. 5, the gear 336 is engaged with and is driven by a worm 340 formed on the drive shaft 76 at a central portion thereof. Rotation of the gear 336 is in the counterclockwise direction as shown in FIG. 5. The axial dimension of worm 340 is sufficient to permit uninterrupted driving engagement thereof with the gear 336 to be maintained irrespective of the adjusted vertical position of the drive shaft 76.

Fixedly connected to opposite radial faces of the gear 336 by means of suitable screws 342, 342, best shown in FIG. 3, are front and rear annular members 344, 344 also included in said first clutch part. The clutch members 344, 344 are each provided on their outer radial faces with suitable clutch teeth and the inner radial faces of said clutch members engage the housing extension 338 on opposite sides to secure the gear 336 against axial movement. Thus, it will be seen that the worm gear 336 is adapted to be continuously driven by the worm 340 in fixed axial position about the shaft 298. The clutch members 344, 344 rotated with the gear 336 are engaged selectively by additional clutch parts to be described presently.

A second part of the clutch means 290 comprises an annular member 346 and a pin 348 which fixedly secures said member to the shaft 298. The inner radial face of the clutch member 346 is disposed adjacent and rearwardly of the rear clutch member 344 and is provided with suitable clutch teeth adapted to engage the teeth of said clutch member 344. In FIG. 3 the clutch means 290 is shown in a neutral condition and the teeth on the clutch member 346 are spaced axially rearwardly from the teeth on the rear clutch member 344.

A third part of the clutch means 290 comprises an annular flange 350 formed on the aforementioned gear 316. Said flange 350 carries a plurality of suitable radial clutch teeth adapted to engage with the teeth of the front clutch member 344 associated with the gear 336. The gear 316 is supported for rotation about the shaft 298 adjacent and axailly forwardly of the said clutch member 344 on a roller or needle bearing unit 352. Said gear is movable axially relative to the shaft 298 and with the said shaft so that the teeth on its flange 350 may be engaged with the teeth on the front clutch member 344. In the neutral condition in which the clutch means is shown in FIG.3, the teeth on the flange 350 are spaced axially forwardly of the teeth on said front clutch member 334.

It will be apparent from the foregoing that the clutch member 346 is moved axially forwardly to engage the teeth thereof with the teeth of the rear member 344 on the gear 336 whereby to connect the first and second clutch parts in driving relationship. Due to the fixed connection of the clutch member 346 with the shaft 298, a forward movement of the said shaft will effect such engagement of the first and second clutch parts. When the shaft 298 is moved forwardly to effect engagement of said clutch parts, a shoulder 354 on said shaft engages a second annular flange 356 on the gear 316 and urges said gear forwardly whereby to insure that the teeth on the front clutch member 344 are disengaged from the teeth on the flange 350 of said gear. The gear 296 formed on the shaft 298 is of sufficient length to remain in engagement with the gear 292 during such axial clutch engaging movement of the shaft 298 and therefore drives the said gear 292 and the shaft 266 and pinions 264, 264. As mentioned previously, the speed of rotation of the shaft 266 and the pinions 264, 264 is relatively low when the same are driven through the first gear train 286 comprising the gears 296 and 292 and the table 14. Thus, the carriage 18, and the cutter 20 are moved leftwardly at a suitable speed for a feed pass of the cutter beneath the workpiece W. During such operation of the first gear train 286, the second gear train 288 is operated in reverse direction. That is, the gear 306 drives the gear 308 which, in turn, drives the gear 316. The teeth carried by the flange 350 of the gear 316 being disengaged from the teeth of the front clutch member 244, the said gear is rotated freely about the rotating shaft 298 in a direction opposite to the direction of rotation of the shaft.

In order to effect a rightward rapid traverse or return movement of the table, carriage, and cutter beneath the workpiece after completion of a leftward cutting or feed pass, the third clutch part is engaged with the first clutch part and the second clutch part is disengaged from said first clutch part. It will be apparent that axial movement of the gear 316 rearwardly is required to effect such clutch engagement. When the gear 316 is moved rearwardly, the aforementioned second flange 356 thereon engages the shoulder 354 on the shaft 298 and urges said shaft rearwardly as the teeth on the flange 350 engage with the teeth on the front clutch member 344. Such rearward movement of the shaft 298 insures that the teeth on the clutch member 346 are disengaged from the teeth on the rear clutch member 344. Upon engagement of the teeth on the gear flange 350 with the teeth on the front clutch member 344, the gear 316 is rotated about the shaft 298 and drives the gear 308 which in turn drives the gear 306 to rotate the shaft 266 and the pinions 264, 264 for rapid traverse return movement of the table 14, the carriage 18, and the cutter 20. It will be observed that during such operation of the second gear train 288, the first gear train 286 is operated in a reverse direction. That is, the gear 292 rotates the gear 296 and thus the shaft 298 within the gear 316, the rotation of said shaft within said gear being opposite in direction to the rotation thereof.

As mentioned previously, clutch engaging and disengaging operations are effected by axial movements of the shaft 298 and the sleeve 332. In FIG. 3 it will be observed that the sleeve 332 is provided at its projecting forward end with a flange 358. A handwheel 360 is fixedly secured to the forward end of the shaft 298 which extends within the sleeve 332 by means of a suitable key 362 and is in axial engagement with the flange 358. Forward movement of the handwheel 360 relative to the shaft 298 is positively prevented by a snap ring 364. Thus, it will be seen that forward axial movement of the sleeve 332 effects similar forward movement of the shaft 298. Rearward movement of the sleeve 332 causes the rear end thereof which is disposed adjacent the gear 316 to engage the said gear and urge the same axially rearwardly. The annular flange 356 on the gear 316 is thus moved into engagement with the shoulder 354 on the shaft 298 to urge the said shaft rearwardly. Thus, rearward movement of the sleeve 332 results indirectly in a similar rearward movement of the shaft 298.

Figure 8:
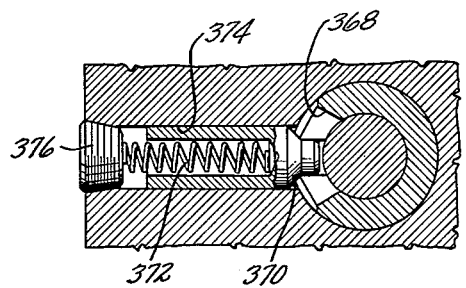
FIG. 8 is an enlarged fragmentary sectional view taken as indicated by the line 8—8 in FIG. 3.

Forward and rearward axial movements of the sleeve 332 are accomplished manually by angular movements of a shift lever 366 in a radial plane. The lever 366 is fixedly secured to the forward end portion of the sleeve 332 as by suitable welding so that angular movements thereof are effective to rotate the sleeve. As best illustrated in FIG. 8, the sleeve 332 is provided with a cam slot 368 and a pin cam 370 projects into said slot and is biased inwardly by means of a spring 372. The pin cam 370 and the biasing spring 372 are disposed within a suitable aperture 374 formed in the outer portion of the housing 64 and are retained therein by means of a threaded plug 376. The cam slot 368, as best illustrated in FIG. 3, is inclined from a radial plane so that rotation of the sleeve 332 by the shift lever 366 causes the said sleeve to be moved axially. When the lever 366 is moved in a clockwise direction, as viewed from the left in FIG. 3, the sleeve 332 is moved axially rearwardly and causes the first and third clutch parts to be engaged and a rapid traverse return movement of the table and carriage toward the right is initiated. When, on the other hand, the shift lever is rotated in a counterclockwise direction, the sleeve 332 is moved axially forwardly and causes the first and second clutch parts to be engaged and a feed movement of the table and carriage toward the left is initiated.

The handwheel 360 may be utilized to effect manual longitudinal movement of the table, carriage, and cutter in either the feed or return direction. It is to be observed, however, that the shift lever 366 must be in the neutral position in order for the said handwheel to be operated conveniently to effect longitudinal movement of the said table and carriage. If the first clutch part is engaged with either the second or third clutch part, it is necessary to drive the worm gear 336, the worm 340 and the other aforementioned parts connected with the drive shaft 76 in order to effect longitudinal movements of the table and carriage.

The operation of the milling machine of the present invention should be readily apparent from the foregoing and only a brief summary thereof is believed necessary. A workpiece W, such as a head for an automotive engine, may be placed face down on the table 14 suitably positioned rightwardly from the position shown in FIGS. 1 and 2 and with the cutter 20 adjusted downwardly so as not to interfere with the workpiece. The downwardly facing surface or portion of the workpiece is thus automatically and conveniently located for machining and the clamping means 16 may be engaged with the workpiece to fixedly hold the same in position. If desired, suitable shims may be placed on the table before the workpiece is deposited thereon in order to insure that the table will not engage the lower surface of the workpiece during the subsequent longitudinal movements of said table.

After the workpiece has been clamped in position, the table and carriage may be moved rightwardly from beneath the workpiece to a position opposite that shown in FIGS. 1 and 2 by rotating the handwheel 360 in a suitable direction. The knob 230 may then be turned to adjust the position of the cutter 20 upwardly so that it will project above the table 14 as required to effect a cut of selected depth in the bottom surface of the workpiece. The electric motor 144 may then be set in operation and the shift lever 366 may be rotated in a counterclockwise direction to initiate a leftward feed pass of the table, carriage, and cutter beneath the workpiece. When the feed pass has been completed, the shift lever 366 engages a pin 380 located at a left-hand portion of the front frame member 22 and is moved thereby to a neutral position wherein the sleeve 332 is positioned to effect disengagement of the three parts of the clutch means 290. The shift lever may then be rotated in a clockwise direction to initiate a rightward rapid traverse return movement. At the end of said movement, the lever engages a second pin 378 at the right-hand portion of the frame member 22 and is again moved to its neutral position. Thereafter, if a second cut on the workpiece is required, the cutter may be again elevated and the foregoing operations may be repeated in sequence.

The invention claimed is:

1. A milling machine comprising a frame having a longitudinal opening therein which is readily accessible from above the frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of the table may be effected independently of the workpiece to permit machining of said downwardly facing workpiece portion, a carriage supported in said frame opening for longitudinal movement beneath a workpiece held in said clamping means, and a rotatable milling cutter adjustable vertically on said carriage and movable longitudinally therewith for machining said downwardly facing workpiece portion during longitudinal movement of the carriage therebeneath.

2. A milling machine comprising a frame having a longitudinal opening therein which is readily accessible from above the frame, a work locating table supported for longitudinal movement in said frame opening and adapted to support and accurately position a workpiece placed thereon with the portion thereof to be machined facing downwardly, clamping means on the frame adapted to engage a workpiece on the locating table and positively hold the workpiece in fixed position so that longitudinal movement of the table may be effected independently of the workpiece to permit machining of said downwardly facing workpiece portion, a carriage supported by said table for longitudinal movement therewith beneath a workpiece held in said clamping means, and an upwardly exposed milling cutter supported by said carriage for rotation about a vertical axis, said cutter being adapted for vertical adjustment so as to project above the level of said table and effect a cut of selected depth in the downwardly facing portion of the workpiece during longitudinal movement of the carriage and cutter therebeneath.

3. A milling machine comprising a frame having a longitudinal opening therein which is readily accessible from above the frame, a work locating table having a vertical opening therein supported for longitudinal movement in said frame opening and adapted to support and accurately position a workpiece placed thereon with the portion thereof to be machined facing downwardly, clamping means on the frame adapted to engage a workpiece placed on the locating table and positively hold the workpiece in fixed position so that longitudinal movement of the table may be effected independently of the workpiece to permit machining of said downwardly facing workpiece portion, a carriage supported below said table for longitudinal movement therewith beneath a workpiece held in said clamping means, and a milling cutter disposed in said vertical table opening and supported by said carriage for rotation about a vertical axis, said cutter being adapted for vertical adjustment relative to the table so as to project above the same and effect a cut of selected depth in the said downwardly facing portion of the workpiece during longitudinal movement of the table and cutter therebeneath.

4. A milling machine comprising a frame having a longitudinal opening therein which is readily accessible from above the frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of the table may be effected independently of the workpiece to permit machining of said downwardly facing workpiece portion, a carriage supported for longitudinal movement in said frame opening beneath a workpiece held in said clamping means, a rotatable milling cutter supported on said carriage for vertical adjustment toward and away from said downwardly facing workpiece portion, power operating means on said carriage connected in driving relationship with said cutter, and automatic feed means driven by said power operating means and operable to move said carriage longitudinally in said frame opening whereby to engage said milling cutter with said downwardly facing workpiece portion and to feed the same therealong.

5. A milling machine comprising a frame having a longitudinal opening therein which is readily accessible from above the frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of the table may be effected independently of the workpiece to permit machining of said downwardly facing workpiece portion, a carriage supported for longitudinal movement in said frame opening beneath a workpiece held in said clamping means, a shaft supported for rotation about a vertical axis and for vertical adjustment on said carriage, a milling cutter fixedly mounted at the upper end portion of said shaft and exposed upwardly so as to be engageable with said downwardly facing workpiece portion, power operating means supported by said carriage and connected in driving relationship with said shaft, and automatic feed and rapid traverse return means adapted to be selectively connected with said shaft respectively to move said carriage longitudinally in said frame opening in one and an opposite direction whereby to effect cutting and return passes of said cutter along said downwardly facing workpiece portion.

6. A milling machine comprising a frame having a longitudinal opening therein which is readily accessible from above the frame, at least one longitudinally extending rack on said frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of the table may be effected independently of the workpiece to permit machining of said downwardly facing workpiece portion, a carriage supported for longitudinal movement in said frame opening beneath a workpiece held in said clamping means, a shaft supported for rotation about a vertical axis and for vertical adjustment on said carriage, a milling cutter fixedly mounted at the upper end portion of said shaft and exposed upwardly so as to be engageable with said downwardly facing workpiece portion, power operating means supported by said carriage and connected in driving relationship with said shaft, clutch means comprising a first clutch part connected with and continuously driven by said vertical shaft and second and third clutch parts selectively engageable with said first clutch part so as to be driven thereby, and power transmitting means comprising at least one pinion supported for rotation on said carriage and operatively engaged with said frame rack and also comprising first and second gear trains each connected in driving relationship with said pinion and respectively connected with said second and third clutch parts so as to be driven thereby, one of said gear trains being operable when its connected clutch part is driven by said first clutch part to rotate said pinion in one direction whereby to cause said table and carriage to be moved longitudinally in one direction, and the other of said gear trains being operable when its connected clutch part is driven by said first clutch part to rotate said pinion in an opposite direction whereby to cause said table and carriage to be moved longitudinally in an opposite direction.

7. A milling machine as set forth in claim 6 wherein there is included a manually operable means for driving at least one of said gear trains to effect longitudinal movement of said carriage and milling cutter.

8. A milling machine comprising a frame having a longitudinal opening therein which is readily accessible from above the frame, at least one longitudinally extending rack on said frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of the table may be effected independently of the workpiece to permit machining of said downwardly facing workpiece portion, a carriage supported for longitudindal movement in said frame opening beneath a workpiece held in said clamping means, a first shaft supported for rotation about a vertical axis and for vertical adjustment on said carriage, a milling cutter fixedly mounted at the upper end portion of said shaft and exposed upwardly so as to be engageable with said downwardly facing workpiece portion, power operating means supported by said carriage and connected in driving relationship with said shaft, a second shaft supported by said carriage for rotation about a horizontal axis and adapted to be moved axially in one and opposite directions, a first clutch part connected with and continuously driven by said first shaft in a fixed position along the axis of said second shaft, a second clutch part fixedly connected to said second shaft adjacent said first clutch part and adapted to be engaged with and disengaged from said first clutch part by axial movement of said second shaft in said one and opposite directions, a third clutch part disposed adjacent said first clutch part and adapted to be engaged with and disengaged from said clutch part by movement along the axis of said second shaft, said third clutch part being operatively connected with said second shaft so as to be disengaged from said first clutch part by movement of said shaft in said one direction and so as to move said shaft axially in said opposite direction to disengage said first and second clutch parts when moved into engagement with said first clutch part, manually operable means adapted to selectively move said second shaft in said one direction and said third clutch part into engagement with said first clutch part, and power transmitting means comprising at least one pinion supported for rotation on said carriage and operatively engaged with said frame rack, said power transmitting means also comprising first and second gear trains each connected in driving relationship with said pinion and respectively connected with said second and third clutch parts so as to be driven thereby, one of said gear trains being operable when its connected clutch part is driven by said first clutch part to rotate said pinion in one direction and the other of said gear trains being operable when its connected clutch part is driven by said first clutch part to rotate said pinion in the opposite direction.

9. A milling machine comprising a frame having a longitudinal opening therein which is readily accessible from above the frame, at least one longitudinally extending rack on said frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of the table may be effected independently of the workpiece to permit machining of said downwardly facing workpiece portion, a carriage supported for longitudinal movement in said frame opening beneath a workpiece held in said clamping means, a first shaft supported for rotation about a vertical axis and for vertical adjustment on said carriage, a milling cutter fixedly mounted at the upper end portion of said shaft and exposed upwardly so as to be engageable with said downwardly facing workpiece portion, power operating means supported by said carriage and connected in driving relationship with said shaft, a second shaft supported by said carriage for rotation about a horizontal axis and adapted to be moved axially in one and opposite directions, a first clutch part connected with and continuously driven by said first shaft in a fixed position along the axis of said second shaft, a second clutch part fixedly connected to said second shaft adjacent said first clutch part and adapted to be engaged with and disengaged from said first clutch part by axial movement of said second shaft in said one and opposite directions, a third clutch part disposed adjacent said first clutch part and adapted to be engaged with and disengaged from said first clutch part by movement along the axis of said second shaft, said third clutch part being operatively connected with said second shaft so as to be disengaged from said first clutch part by movement of said shaft in said one direction and so as to move said shaft axially in said opposite direction to disengage said first and second clutch parts when moved into engagement with said first clutch part, a rotatable and axially movable sleeve surrounding a portion of said second shaft and operatively connected therewith and with said third clutch part, said sleeve being adapted to effect axial movement of said shaft in said one direction when moved axially in one direction and to effect engagement of said third clutch part with said first clutch part when moved axially in an opposite direction, manually operable means for axially moving said sleeve in said one and opposite directions, and power transmitting means comprising at least one pinion supported for rotation on said carriage and operatively engaged with said frame rack, said power transmitting means also comprising first and second gear trains each connected in driving relationship with said pinion and respectively connected with said second and third clutch parts so as to be driven thereby, one of said gear trains being operable when its connected clutch part is driven by said first clutch part to rotate said pinion in one direction and the other of said gear trains being operable when its connected clutch part is driven by said first clutch part to rotate said pinion in the opposite direction.

10. A milling machine comprising a frame having a longitudinal opening therein which is readily accessible from above the frame, at least one longitudinally extending rack on said frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of table may be effected independently of the workpiece to permit machining of said downwardly facing workpiece portion, a carriage supported for longitudinal movement in said frame opening beneath a workpiece held in said clamping means, a first shaft supported for rotation about a vertical axis and for vertical adjustment on said carriage, a milling cutter fixedly mounted at the upper end portion of said shaft and exposed upwardly so as to be engageable with said downwardly facing workpiece portion, power operating means supported by said carriage and connected in driving relationship with said shaft, a second shaft supported by said carriage for rotation about a horizontal axis and adapted to be moved axially in one and opposite directions, a first clutch part connected with and continuously driven by said first shaft in a fixed position along the axis of said second shaft, a second clutch part fixedly connected to said second shaft adjacent said first clutch part and adapted to be engaged with and disengaged from said first clutch part by axial movement of said second shaft in said one and opposite directions, a third clutch part disposed adjacent said first clutch part and adapted to be engaged with and disengaged from said clutch part by movement along the axis of said second shaft, said third clutch part being operatively connected with said second shaft so as to be disengaged from said first clutch part by movement of said shaft in said one direction and so as to move said shaft axially in said opposite direction to disengage said first and second clutch parts when moved into engagement with said first clutch part, a rotatable and axially movable sleeve surrounding a portion of said second shaft and operatively connected therewith and with said third clutch part, said sleeve being adapted to effect movement of said shaft in said one direction when moved axially in one direction and engagement of said third clutch part with said first clutch part when moved axially in an opposite direction, an angularly movable manual shift lever for rotating the said sleeve in one and an opposite direction, means operatively connected with said sleeve for respectively effecting axial movement of the same in said one and opposite directions on rotation thereof in said one and opposite directions, and power transmitting means comprising at least one pinion supported for rotation on said carriage and operatively engaged with said frame rack, said power transmitting means also comprising first and second gear trains each connected in driving relationship with said pinion and respectively connected with said second and third clutch parts so as to be driven thereby, one of said gear trains being operable when its connected clutch part is driven by said first clutch part to rotate said pinion in one direction and the other of said gear trains being operable when its connected clutch part is driven by said first clutch part to rotate said pinion in an opposite direction.

11. A milling machine comprising a frame having a longitudinal opening therein which is readily accessible from above the frame, at least one longitudinally extending rack on said frame, a work locating table supported for longitudinal movement in said frame opening and adapted to support and accurately position a workpiece placed thereon with the portion of the workpiece to be machined facing downwardly, clamping means on the frame adapted to engage a workpiece placed on the locating table and positively hold the same in fixed position so that longitudinal movement of the table may be effected independently of the workpiece to permit machining of said downwardly facing workpiece portion, a carriage supported for longitudinal movement in said frame opening beneath a workpiece held in said clamping means, a first shaft supported for rotation about a vertical axis and for vertical adjustment on said carriage, a milling cutter fixedly mounted at the upper end portion of said shaft and exposed upwardly so as to be engageable with said downwardly facing workpiece portion, power operating means supported by said carriage and connected in driving relationship with said shaft, a second shaft supported by said carriage for rotation about a horizontal axis and adapted to be moved axially in one and opposite directions, a first clutch part connected with and continuously driven by said first shaft in a fixed position along the axis of said second shaft, a second clutch part fixedly connected to said second shaft adjacent said first clutch part and adapted to be engaged with and disengaged from said first clutch part by axial movement of said second shaft in said one and opposite directions, a third clutch part disposed adjacent said first clutch part and adapted to be engaged with and disengaged from said clutch part by movement along the axis of said second shaft, said third clutch part being operatively connected with said second shaft so as to be disengaged from said first clutch part by movement of said shaft in said one direction and so as to move said shaft axially in said opposite direction to disengage said first and second clutch parts when moved into engagement with said first clutch part, a rotatable and axially movable sleeve surrounding a portion of said second shaft and operatively connected therewith and with said third clutch part so as to effect axial movement of said shaft when moved axially in one direction and engagement of said third clutch with said first clutch part when moved axially in an opposite direction, said sleeve being provided with a cam slot inclined from a radial plane, a cam pin supported in fixed position by said carriage projecting into said cam slot, the inclination of said cam slot being such that rotation of said sleeve in one and an opposite direction will result in axial movement of said sleeve in said one and opposite directions, an angularly movable manual shift lever for rotating said sleeve in said one and opposite directions, and power transmitting means comprising at least one pinion supported for rotation on said carriage and operatively engaged with said frame rack, said power transmitting means also comprising first and second gear trains each connected in driving relationship with said pinion and respectively connected with said second and third clutch parts so as to be driven thereby, one of said gear trains being operable when its connected clutch part is driven by said first clutch part to rotate said pinion in one direction and the other of said gear trains being operable when its connected clutch part is driven by said first clutch part to rotate said pinion in an opposite direction.

12. A flat surface milling machine comprising a frame having a longitudinal opening therein which is readily accessible from above the frame, a substantially flat work locating table having a vertical opening therein supported for longitudinal movement in said frame opening and adapted to support and accurately position a workpiece placed thereon with a flat surface on the workpiece which is to be machined facing downwardly, clamping means on the frame adapted to engage a workpiece placed on the locating table and positively hold the workpiece in fixed position so that longitudinal movement of the table may be effected independently of the workpiece to permit machining of said downwardly facing workpiece surface, a carriage supported below said table for longitudinal movement therewith beneath a workpiece held in said clamping means, and a milling cutter disposed in said vertical table opening and supported by said carriage for rotation about a vertical axis, said cutter carrying a plurality of circumaxially arranged outwardly and upwardly projecting cutting tools and being adapted for vertical adjustment relative to the table so that its cutting tools can be located above said table to effect a cut of selected depth in the said downwardly facing surface of the workpiece during longitudinal movement of the table and cutter therebeneath.

13. A flat surface milling machine comprising a frame having a longitudinal opening therein which is readily accessible from above the frame, a substantially flat work locating table having a vertical opening therein supported for longitudinal movement in said frame opening and adapted to support and accurately position a workpiece placed thereon with a flat surface on the workpiece which is to be machined facing downwardly, a clamping means on the frame adapted to engage a workpiece placed on the locating table and positively hold the workpiece in fixed position so that longitudinal movement of the table may be effected independently of the workpiece to permit machining of said downwardly facing workpiece surface, a carriage supported below said table for longitudinal movement therewith beneath a workpiece held in said clamping means, and a milling cutter disposed in said vertical table opening and supported by said carriage for rotation about a vertical axis, said cutter comprising a cutter head carrying a plurality of circumaxially arranged outwardly and upwardly projecting cutting tools each of which is biased in said outward and upward direction by spring means and held in fixed position by positive retaining means, and said cutter being adjustable vertically in said table opening so that its cutting tools can be located above said table to effect a cut of selected depth in the said downwardly facing surface of the workpiece during longitudinal movement of the table and cutter therebeneath.

14. A flat surface milling machine comprising a frame having a longitudinal opening therein which is readily accessible from above the frame, at least one longitudinally extending rack on said frame, a substantially flat work locating table having a vertical opening therein supported for longitudinal movement in said frame opening and adapted to support and accurately position a workpiece placed thereon with a flat surface thereof which is to be machined facing downwardly, clamping means on the frame adapted to engage a workpiece placed on the locating table and positively hold the workpiece in fixed position so that longitudinal movement of the table may be effected independently of the workpiece to permit machining of said downwardly facing workpiece surface, a carriage supported below said table for longitudinal movement therewith beneath a workpiece held in said clamping means, a shaft with its upper end portion in said table opening supported for rotation about a vertical axis and for vertical adjustment on said carriage, a milling cutter fixedly mounted at the upper end portion of said shaft, said cutter carrying a plurality of circumaxially arranged outwardly and upwardly projecting cutting tools which can be located above said table by vertical adjustment of said shaft so as to effect a cut of selected depth in said downwardly facing workpiece surface during longitudinal movement of said table and carriage therebeneath, power operating means supported by said carriage and connected in driving relationship with said shaft, clutch means comprising a first clutch part connected with and continuously driven by said vertical shaft and second and third clutch parts selectively engageable with said first clutch part so as to be driven thereby, and power transmitting means comprising at least one pinion supported for rotation on said carriage and operatively engaged with said frame rack and also first and second gear trains each connected in driving relationship with said pinion and respectively connected with said second and third clutch parts so as to be driven thereby, one of said gear trains being operable when its connected clutch part is driven by said first clutch part to rotate said pinion in one direction whereby to cause said table and carriage to be moved longitudinally in one direction, and the other of said gear trains being operable when its connected clutch part is driven by said first clutch part to rotate said pinion in an opposite direction whereby to cause said table and carriage to be moved longitudinally in an opposite direction.

References Cited in the file of this patent

UNITED STATES PATENTS

| | | |
|---|---|---|
| 516,838 | Riddell | Mar. 20, 1894 |
| 1,225,552 | Wuesthoff | May 8, 1917 |
| 1,539,471 | Deuring | May 26, 1925 |
| 2,164,620 | Parish | July 4, 1939 |
| 2,709,875 | Touray | June 7, 1955 |
| 2,881,569 | Strnad et al. | Apr. 14, 1959 |